(12) United States Patent
Łyjak et al.

(10) Patent No.: US 11,237,863 B2
(45) Date of Patent: Feb. 1, 2022

(54) METHOD FOR LEVERAGING THE VIRTUAL HARDWARE RESOURCES PHYSICALLY LOCATED ON THE SERVER BY MEANS OF THE MOBILE ELECTRONIC MODULE PROVIDED WITH THE PERIPHERAL DEVICE CONNECTION PORTS

(71) Applicant: Exon Sp. z o.o., Toruń (PL)

(72) Inventors: Piotr Łyjak, Dobrzejewice (PL); Dariusz Adamczyk, Toruń (PL); Mateusz Karcz, Toruń (PL)

(73) Assignee: Exon Sp. z o.o., Torun (PL)

( * ) Notice: Subject to any disclaimer, the term of this patent is extended or adjusted under 35 U.S.C. 154(b) by 4 days.

(21) Appl. No.: 16/595,426

(22) Filed: Oct. 7, 2019

(65) Prior Publication Data
US 2021/0109771 A1 Apr. 15, 2021

(30) Foreign Application Priority Data
Oct. 7, 2018 (PL) .......................................... 427341

(51) Int. Cl.
G06F 9/455 (2018.01)
G06F 9/54 (2006.01)
G06F 9/50 (2006.01)

(52) U.S. Cl.
CPC ........ *G06F 9/45558* (2013.01); *G06F 9/5077* (2013.01); *G06F 9/54* (2013.01); *G06F 2009/4557* (2013.01)

(58) Field of Classification Search
CPC ...... G06F 9/5077; G06F 9/54; G06F 9/45558; G06F 2009/4557
See application file for complete search history.

(56) References Cited

U.S. PATENT DOCUMENTS

| 2005/0120160 | A1 | 6/2005 | Ploufee et al. | |
|---|---|---|---|---|
| 2005/0282532 | A1* | 12/2005 | Dotan ................. | G06F 9/45504 455/418 |
| 2011/0274258 | A1* | 11/2011 | Casalaina .......... | H04M 7/0057 379/93.01 |
| 2014/0040374 | A1* | 2/2014 | Olsen .................... | G06Q 10/10 709/204 |

(Continued)

FOREIGN PATENT DOCUMENTS

| CN | 102655532 A | 9/2012 |
|---|---|---|
| CN | 102739771 A | 10/2012 |

(Continued)

*Primary Examiner* — Tuan C Dao
(74) *Attorney, Agent, or Firm* — Andrzej Malarz, Esq.

(57) ABSTRACT

The method of applying the virtual hardware resources, physically located on the server by the mobile electronic module, provided with the peripheral device connection ports by way of which the user is applying the computer program executed on the server characterized in that the user locates the computer program on the server then the server is executing the computer program using the application programming interface (API), any server-module communication between server and the mobile electronic module occurs by an exchange of the server-module instructions or server-module data with use of the application programming interface (API) by any server-module communication allowing for the internet access.

3 Claims, 2 Drawing Sheets

(56) References Cited

U.S. PATENT DOCUMENTS

| | | | | |
|---|---|---|---|---|
| 2014/0364138 A1* | 12/2014 | Huang | ............... | G01S 19/48 |
| | | | | 455/456.1 |
| 2017/0068954 A1* | 3/2017 | Hockey | ............. | H04L 9/3213 |
| 2018/0267847 A1* | 9/2018 | Smith | ................ | G06F 9/547 |
| 2019/0220867 A1* | 7/2019 | Karani | ............ | G06F 21/6245 |

FOREIGN PATENT DOCUMENTS

| | | |
|---|---|---|
| CN | 106961367 A | 7/2017 |
| CN | 107426034 A | 12/2017 |

\* cited by examiner

METHOD FOR LEVERAGING THE VIRTUAL HARDWARE RESOURCES PHYSICALLY LOCATED ON THE SERVER BY MEANS OF THE MOBILE ELECTRONIC MODULE PROVIDED WITH THE PERIPHERAL DEVICE CONNECTION PORTS

FIELD OF THE INVENTION

The object of the present invention is the method of applying the virtual hardware resources physically located on the server by the mobile electronic module provided with the peripheral device connection ports having its application in automation, robotics, education, healthcare, sensorics, utility electronics, entertainment and other fields.

BACKGROUND

The Central Processing Unit is determined in brief as CPU. Abbreviation derives from English language, and specifically from "Central Processing Unit". The central processing unit constitutes processor which is following the computer program instructions. These are arithmetical, logic, control and input/output (I/O) operations determined in the instructions.

The processors are performing chain of the simple mathematical-logic operations from the plurality of the basic operations determined usually by the processor's producer as the list of the processor's commands. The processors are made usually as the integrated circuits contained in the hermetic housing and in such form, they are called the microprocessors. The silicon monocrystal is the heart of the processor on which a series of semiconductor layers has been applied by the photolithography technique, forming, depending on the applications, the network, from several thousands to several billions, of the transistors. Its circuits are being made from metals of good electrical conductivity, such as aluminum or copper.

One of the main parts of the processor is the arithmetic logic unit (deriving from English language: "arithmetic logic unit", called in brief: ALU), which is the digital arrangement for performing the arithmetic operations, such as the adding, the subtraction etc., the logic operations, for example, Ex-Or (exclusive alternative) between the two digits and single-argument operations, such as the logical shift and negation. ALU is the basic block of the computer central processing unit.

In the prior art, known are the servers which constitute program providing services for other applications, generally leveraging other computers linked in the form of the network. The server is also called computer providing such services, generally coming down to provide certain resources for other computers or mediate in data transfer between computers. The servers are called also the programming arrangements taking part in providing the resources. The servers as machines are adapted for continuous operation. They are provided with the large and fast hard discs, large the random access memory RAM (deriving from English language: "Random Access Memory"), the efficient server processors and other peripherals, such as, for example, the GPU or the network card. Frequently, the server mainboards may serve many processors.

It is also known the leveraging of the so called peripheral devices, constituting any part of the computer other than CPU and the random access memory, for example, the keyboard, the monitor, the mouse, the printer, the flat belt drive, the microphone, the IP camera. They are divided into devices of input and output.

From the patent no US 20100777218, the computing cloud system is known which allows for the computing cloud session to be created, monitored and controlled, provided by other provider.

Known is Polish patent application no PL 395672. In the method for the resource managing in the computer networks of the "computing cloud" type in which customers are connecting to the communication interface of the "computing cloud" by means of the service provider in the "computing cloud", the mutually connected modules: 1. The internet-based application module for system servicing; 2. The direct service managing module; 3. The service contracting module; 4. The billing module; 5. The admin panel; 6. The external system integration module, are leveraged.

In the previous solutions, about what kind of the computer hardware (called otherwise hardware platform) will be leveraged, suitable programming parameters (application) decide.

And so, in the case of the simple and technologically non-advanced application, there will be low hardware requirements, and in consequence, the computer hardware with suitably lower parameters will be leveraged.

Whereas, in the situation, if there is necessity, for example, for creating, modifying and testing by the software developer the programming with suitably higher requirements as to the technical parameters, then there exist necessity for application of the hardware on the level suitable for the programming. It causes the unquestionable necessity for application of the suitable hardware and/or modification of the existing hardware, what in turn, is connected with additional expenses, which cause the costs of overall software production more expensive, and in effect, final price for the end user.

SUMMARY

The solution according to the present invention eliminates these drawbacks in the field of the microprocessor systems and embedded systems, offering alternative for the existing solutions.

The essence of the present invention is the method of applying the virtual hardware resources physically located on the server by use of the mobile electronic module provided with peripheral device connection ports, by which the user is using the computer program executed on the server characterizing in that the user locates the computer program on the server, then server is executing the computer program using the application programming interface (API), any server-module communication between the server and mobile electronic module occurs by an exchange of the server-module instructions or server-module data with use of the application programming interface (API), by use of any server-module communication, allowing for the internet access, then the mobile electronic module receives, applying the communication system allowing for the internet access, using the application programming interface (API) server-module instructions or server-module data sent from the server by use of any server-module communication which then are transferred to the integrated circuit SoC which after their analysis, communicates with, connected to the mobile electronic module through the input/output I/O interfaces, with using any module-peripheral communication, at least the one peripheral device, to which sends the module-peripheral instructions or module-peripheral data treated as output data, then to the mobile electronic module from at least the one peripheral device by use of the input/output I/O interfaces, with application of any module-peripheral communication, the module-peripheral instructions or module-peripheral data are transferred treated as input data, which are transferred further to the integrated circuit SoC therefrom, then input data in the form of server-module data or the server-module instructions, with application of the application programming interface (API), by use of any server-module communication, using a communication system allowing for the internet access, are sent on the server, where in accordance with the computer program, their analysis occur.

Preferably, computer program created by the user is located on the server by way of the data carrier.

Preferably, the computer program created by the user is located on the server by way of the internet communication.

The mobile electronic module according to the present invention constitutes the physical module (device) provided with communication system allowing for the internet access, the integrated circuit SoC together with the programming using the application programming interface (API) having access to any input/output I/O interfaces.

Therefore, the present invention does not relate only to the interaction between the programming located and executed on the server and the mobile electronic module, but includes also this specific, physical, having material form of the electronic device (mobile electronic device), by way of which method according the present invention is performed.

In the present invention, any communication between the server and the mobile electronic device occurs by the exchange of the server-module instructions or server-module data with use of the application programming interface (API), through any communication allowing for the internet access.

Communication system used in the present invention is any electronic system providing communication with the server by use of the internet.

The application programming interface (API) leveraged in the method according the present invention is understood as the strictly determined set of rules and their specifications in which the computer programs communicate between each other. It is defined on the level of the source code for the programming components, for example, the computer applications, the libraries, the operating system. The task of the application programming interface (API) is to provide suitable sub-program specifications, the data structures, object types and required communication protocols.

The integrated circuit SoC (deriving from English language: "System-on-a-chip") or SOC ("System On Chip)") leveraged in the method according to the present invention means the integrated circuit comprising complete electronic system, including the digital systems, the microcontroller, the random access memory, the non-volatile memory, the digital-analogue and radio-systems.

In the method according to the present invention, to the mobile electronic module with use of the application programming interface (API) by use of any server-module communication allowing for the internet access, from the server server-module instructions or server-module data received by the communication system present in the mobile electronic module are sent which then it is transferring the received server-module instructions and server module data from the server by way of the communication system to the integrated circuit SoC.

Invention in the embodiment is presented in more detail in the drawings.

DETAILED DESCRIPTION OF THE PREFERRED EMBODIMENTS

Figure 1:
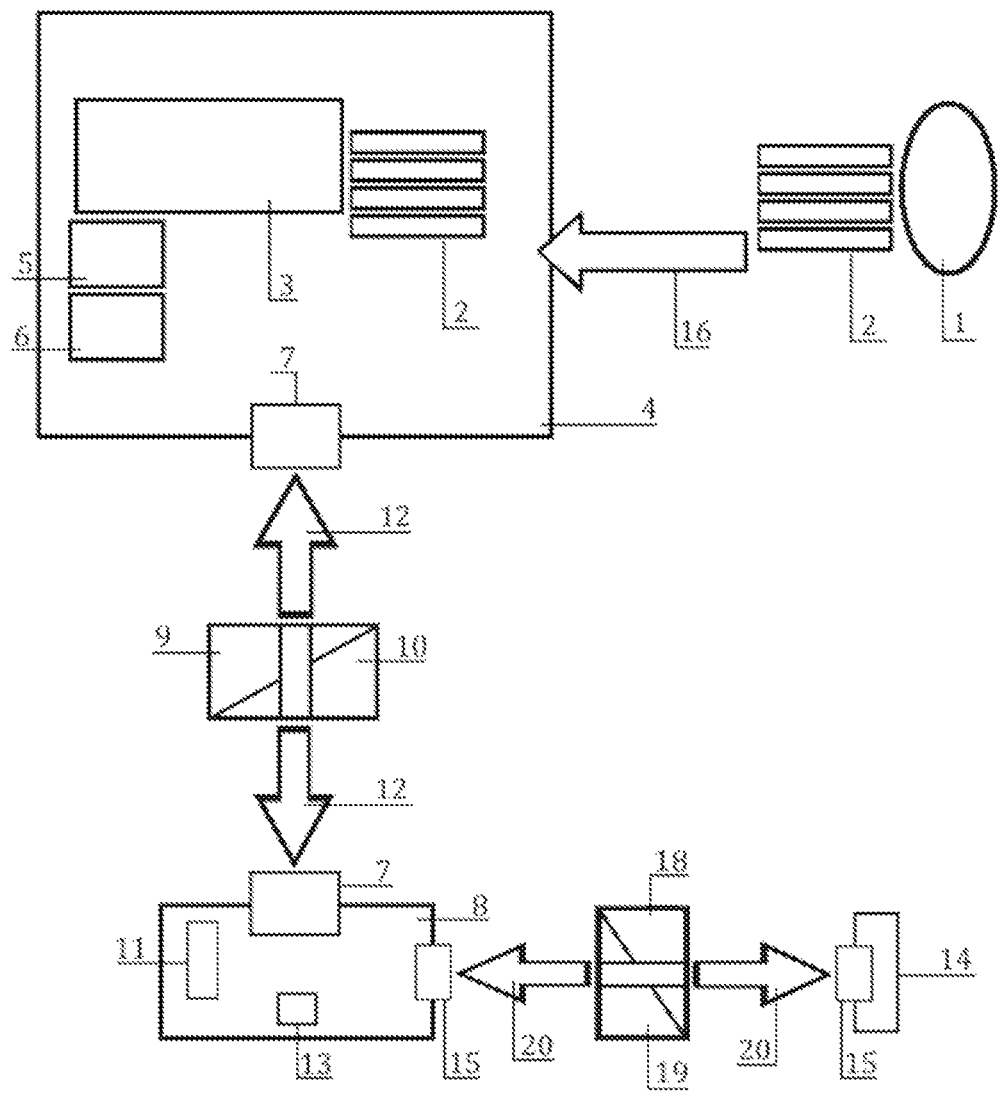
FIG. 1 shows the block diagram showing the operational rule of the method according to the present solution.

The user 1 locates the computer program 2 on the server 4, by use of the internet communication 16. The server 4 has the central processing unit CPU 3, the random access memory 5 and the mass memory 6. Furthermore, the central processing unit CPU 3 is executing the computer program 2 located on the server 4 using the application programming interface (API) 7. Any server-module communication 12 between server 4, and the mobile electronic server occurs by an exchange of the server-module instructions 9 or the server-module data 10 with use of the application programming interface (API) 7, by any server-module communication 12 allowing for the internet access. Any server-module communication 12, which is communication occurring between the server 4 and the mobile electronic module 8 or between the mobile electronic module 8 and the server 4. The server-module instructions 9, these are instructions which may be sent between the server 4 and the mobile electronic module 8, and also between the mobile electronic module 8 and the server 4, and server-module data these are data which may be sent between the server 4 and the mobile electronic module 8, and also between the mobile electronic module 8 and the server 4. Then, the mobile electronic module 8 receives, using the communication system providing the internet access with use of the application programming interface (API) 7, the server-module instructions 9, or server-module data 10, or server-module data 10, sent from the server 4 by use of any server-module communication 12, which then are transferred to the integrated circuit SoC, which after their analysis, communicates with, connected to the mobile electronic module 8 by way of the input/output I/O interfaces 15 with application of any module-peripheral communication 20, at least one peripheral device 14, to which sends the module-peripheral instructions 18 or module-peripheral data 19 treated as output data. Any module-peripheral communication 20, this is communication occurring between the peripheral device 14 and the mobile electronic module 8 or between the electronic module 8 and the peripheral device 14 is performed by way of the input/output I/O interfaces. The module-peripheral instructions, these are instructions, which may be sent between the mobile electronic device 8 and the peripheral device 14, and also between the peripheral device 14 and the mobile electronic module 8, whereas module-peripheral data 19 these are data, which may be sent between the mobile electronic device 8 and the peripheral device 14, and also between the peripheral device 14, the mobile electronic module 8. Then, to the mobile electronic module 8 from at least one peripheral device 14, by use of the input/output I/O interfaces 15, with application of any module-peripheral communication 20, the module-peripheral instructions 18 or module-peripheral data 19, are transferred treated as the input data which are further transferred to the integrated circuit SoC 13. Then, after input data converting by the integrated circuit SoC 13, input data in the form of the server-module instructions 9 or server-module data 10 with the application programming interface (API) 7, by use of any server-module communication 12, applying the communication system 11 allowing for the internet access, are sent on the server 4, where their analysis occurs with application of the central processing unit CPU 3 executing the computer program 2 located on the server 4 by the user 1.

Figure 2:
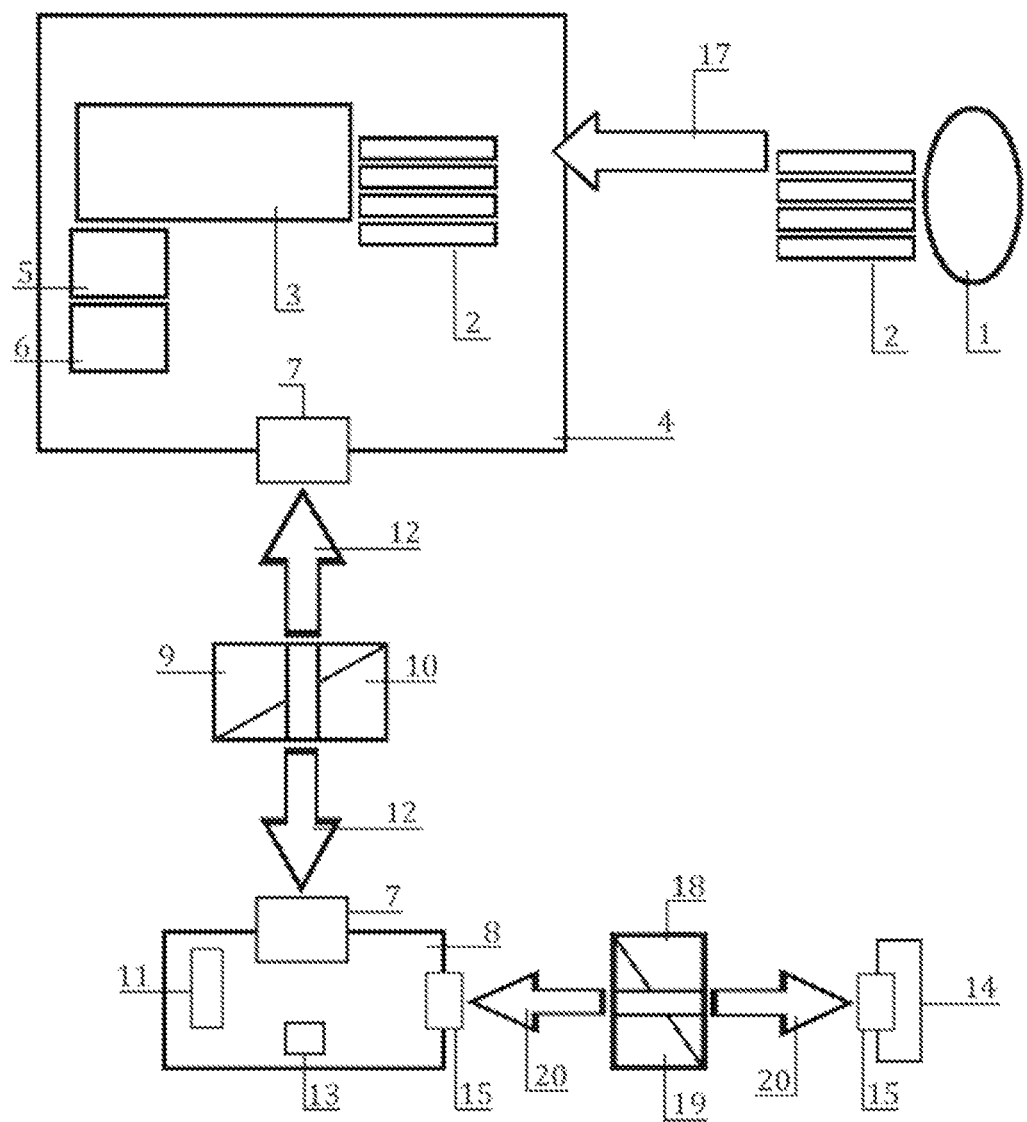
FIG. 2 shows situation where the user locates the computer program on the server by use of the data carrier.

FIG. 2 shows situation where the user 1 locates the computer program 2 on the server 4, by use of the data carrier 17.

Versions of the embodiments presented on FIGS. 1 and 2 may find their application in the executing of any computer program cooperating with the mobile electronic module, which constitutes physical, and thus materially existing solution.

Method according to the present invention may be depicted by way of the application serving for the robot controlling which will has been presented below in more detail in the example 1.

Example 1

The user 1 locates the computer program 2 serving for the robot controlling on the server 34 in which the central processing unit CPU 3, the random access memory 5 and the mass memory 6, are present, then the central processing unit CPU 3 is executing the program 2 located by the user 1 using the application programming interface (API) 7, where the server-module instructions 9 in the form of the command starting the engine and server-module data 10 in the form of preset speed will be sent from the server 4 through any server-module communication 12 allowing for the internet access using the communication system 11 for the mobile electronic module 8, which then are transferred to the integrated circuit SoC 13, which after their analysis sends them in the form of module-peripheral data 19 in the form of PWM signal by way of the input/output I/O interfaces 15 by use of any module-peripheral communication 20 to the peripheral device 14, in this case, servomechanism responsible for robot moving, at the same time, data from distance sensor as the further peripheral device 14 connected to the input/output I/O interfaces 15 by use of any module-peripheral communication 20 in the form of module-peripheral data 19 in the converted form are sent to the integrated circuit SoC 13, which by use of the communication system and by use of any server-module communication 12 allowing for the internet access, sends server-module data 10 in the form of digital voltage value, using the application programming interface (API) 7, as input data for the program 2 executed by the central processing unit located on the server 4, which, based on data received, is computing the distance from the obstacle and controls the robot.

The other embodiment, may be the computer program serving for the speech recognition.

Example 2

The user 1 locates the computer program 2 serving for the speech recognition on the server 4 in which the central processing unit CPU 3 together with the random access memory 5 and the mass memory 6 are present, then central processing unit CPU 3 is executing the program 2 located by the user using the application programming interface (API) 7, module-peripheral data 19 in the form of the sentence "what is the time now?" by use of any module-peripheral communication 20 being sent from peripheral device 14, in this case, from the microphone connected to the input/output I/O interface 15 of the integrated circuit SoC 13, being sent therefrom using the communication system 11 by use of any communication 12 allowing for the internet access in the form of server-module data 10 recognized as input data for the program 2 executed by the central processing unit CPU 3 which after conducting the analysis of input data sends out the server-module instructions 9 and server-module data 10 using the application programming interface (API) 7 for the mobile electronic module 8 applying the communication system 11 by use of any server-module communication 12 they are sent to the integrated circuit SoC 13 therefrom with use of the input/output I/O interface 15 by use of any module-peripheral communication 20 are sent in the form of module-peripheral data 19 recognized as output data in the form of the sentence "now it is 12.00 hour" to the other peripheral device 14 which, in this case, is the loudspeaker.

Thus, in the present invention, the computing power transfer from the server to the physical, mobile electronic module, occurs. In effect of what, practically there no exist restriction in view of the computing efficiency, because every task will be delegated to the programming which is analyzing the data received directly on the server. Ready result of the performed operations is sent to the mobile electronic module.

Due to the application of the invention there no exist restriction of the hardware resources, because all ordered operations are performed on the side of the server cooperating with the mobile electronic module.

As compared with the state of the art solutions, where selection of the hardware platform is dictated with target application, the present invention is the physical, mobile electronic module cooperating with the programming located on the server, what allows for remote use of the programming and executing it on the side of the server in the real time, and not directly in the processor present in the physical electronic module, what causes to become independent from the computing power of the physical mobile electronic module.

The present invention allows for application of the one hardware platform either for the simple applications, and for the advanced computing using large data amount, including image rendering, as well.

Due to the present invention, there is no necessity for use of the specialized hardware, what causes significant producing cost reduction of all the programming, and hardware as well, and in effect, the final price reduction for the end user.

The present invention brings essential possibilities for the software developers, offering the mobile electronic module with the virtualized central processing unit (in the form of CPU processor) and the random access memory and the mass memory. Due to the virtualization of the resources it is possible to develop programming in the languages, such as Python, Java, C, C++, Lua and the others, executing of which is not possible on the integrated circuits SoC having low computing power.

Method for applying the virtual hardware resources, physically located on the server by use of the mobile electronic module allows the user to create either programming, and use of already existing programming which will be located by the user on the server as well, having the central processing unit CPU and the random access memory and the mass memory.

The present invention allows also for solving the problem of the random access system diversity (e.g. GNU/Linux) and applications written in object-oriented programming for the embedded systems. It limits the time and costs connected with the developing of a new product and is quite new class in the field of the programming designing for the embedded systems, what in practice, means obtaining the possibilities to develop programming in the high level languages by the persons having no knowledge connected with the embedded system designing and with the integrated circuits SoC.

The present invention this is the solution intended for the software developers, the automation engineers, the electronic engineers, the hobbyists, and the hardware producers. It is also the solution from which, schools, universities will be able to leverage for the programming learning for the devices existing in the real world.

The present invention is the cheaper alternative with the unlimited resources due to virtualization of the processor resources on the server in relation to much more expensive microcontrollers with limited and constant parameters. Due to its considerable flexibility, it may be applied in automation, robotics, education, healthcare, utility electronics, Internet of Things, sensorics, entertainment and many others sectors of the programming activity.

Unit production cost restricting to the minimum due to using server's computing power, restricts thereby costs, because this solution is significantly cheaper, than its physical equivalent with the same computing power. It matters, in particular, in the context of the rapid development of the server technologies.

Method according the present invention allows for application of the mobile electronic module and simultaneous executing the advanced tasks and computing, unavailable for the low performance processors.

Method according to the present invention enables furthermore on request access to the executed processes and the programming resources located on the server. It is possible as the result of the logics transfer of the programming executed, from the mobile electronic module on the server.

Furthermore, due to the invention application, the significant service cost restriction and the functionality change costs for the devices mounted in hard-to-reach places, are obtained. Due to the program executing on the server side, the software developer has permanent access to the programming and possibilities of introducing modifications at any place and time.

The invention claimed is:

1. A method of applying virtual hardware resources, physically located on a server, by use of a mobile electronic module provided with peripheral device connection ports, wherein a user is using a computer program executed on a server, wherein the method comprises the following steps:
  locating a computer program (2) on the server (4) by the user (1),
  executing the computer program (2) by the server (4) using an application programming interface (API) (7), wherein any server-module communication between the server (4) and mobile electronic module (8) occurs by an exchange of server-module instructions (9) or server-module data (10) with use of the application programming interface (API) (7) by use of any server-module communication (12) allowing for internet access,
  receiving, by the mobile electronic module (8), the server-module instructions (9) or server-module data (10), sent from the server (4) by any server-module communication (12), using a communication system (11) providing the internet access and the API application programming interface (7),
  sending the server-module instructions (9) or server-module data (10) to an integrated circuit SoC (System on Chip) (13),
  analyzing the server-module instructions (9) or server-module data (10) by the integrated circuit SoC (System on Chip) (13),
  communicating of the integrated circuit SoC (System on Chip) (13) with at least one peripheral device (14) connected to the mobile electronic module (8) by way of input/output I/O interfaces (15) using any module-peripheral communication (20),
  sending module-peripheral instructions (18) or module-peripheral data (19), treated as output data, to at least one peripheral device (14) by the integrated circuit SoC (System on Chip) (13),
  transferring the module-peripheral instructions (18) or module-peripheral data (19) from at least one peripheral device (14) to the mobile electronic module (8) by way of the input/output I/O interfaces (15) using any module-peripheral communication (20),
  transferring the module-peripheral instructions (18) or module-peripheral data (19), treated as input data, to the integrated circuit SoC (13),
  transferring the input data in the form of the server-module data (10) or server-module instructions (9), from the integrated circuit SoC (13), to the server (4), with use of the application programming interface (API) (7), by any server-module communication (12), using the communication system (11) allowing for the internet access, and
  analyzing the server-module data (10) or server-module instructions (9) in the server (4) in accordance with a computer program (2).

2. The method according to claim 1, wherein the computer program (2) developed by the user (1) is located on the server (4) by way of a data carrier (17).

3. The method according to claim 1, wherein the computer program (2) developed by the user (1) is located on the server (4) by way of an internet communication (16).

* * * * *